W. GEIST.
CONVEYER.
APPLICATION FILED FEB. 14, 1921.

1,404,692. Patented Jan. 24, 1922.

Inventor
W. Geist
by
Attorney

UNITED STATES PATENT OFFICE.

WALTER GEIST, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

CONVEYER.

1,404,692.   Specification of Letters Patent.   Patented Jan. 24, 1922.

Application filed February 14, 1921. Serial No. 444,774.

*To all whom it may concern:*

Be it known that I, WALTER GEIST, a citizen of the United States, residing at Milwaukee, in the county of Milwaukee and State of Wisconsin, have invented a certain new and useful Improvement in Conveyers, of which the following is a specification.

This invention relates in general to improvements in the construction and operation of screw conveyers of the type comprising a rotary rod-like member having a plurality of successive blades secured thereto to form a substantially continuous helical vane which is adapted to transport granular or pulverulent material along a stationary support.

An object of the invention is to provide a screw conveyer which is simple in construction and efficient in operation. Another object is to provide means for positively preventing the elements of a screw conveyer from becoming disassociated with the conveyer structure. A further object is to provide a screw conveyer having a transporting vane formed in sections which are rigidly attached to a central drive member and which are readily reversible in order to reverse the direction of transportation of the material. Another object is to provide means for effectively locking the several sections of a screw conveyer together. A further object is to provide means for effecting rapid release of the sections of screw conveyer from the central supporting element thereof. An additional object is to generally improve the type of screw conveyer disclosed in applications for patent Serial No. 369,396 and 369,397, both of which were filed on March 25, 1920. These and other objects of the invention will be apparent from the following description.

Some of the novel features disclosed but not specifically claimed herein form the subject of the copending applications previously referred to.

A clear conception of an embodiment of the invention and of the operation of a device constructed in accordance therewith, may be had by referring to the drawing accompanying and forming a part of this specification, in which like reference characters designate the same or similar parts of the several views.

Figure 1:
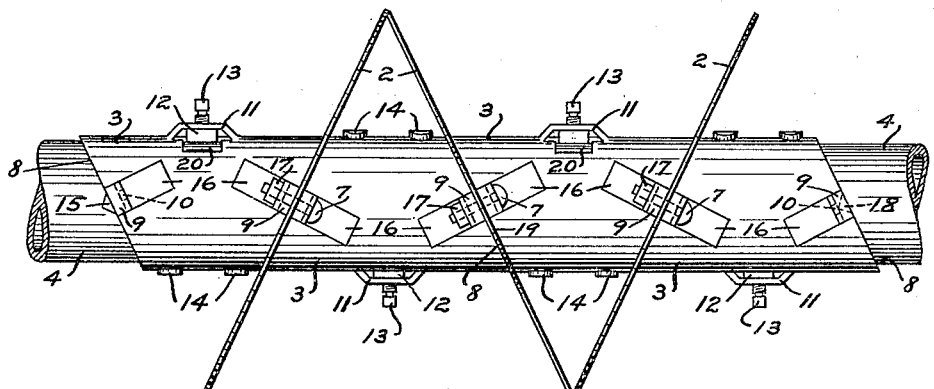
Fig. 1 is a side elevation of several successive sections of a screw conveyer having the successive flights reversibly associated with the central driving element of the conveyer.
Figure 2:
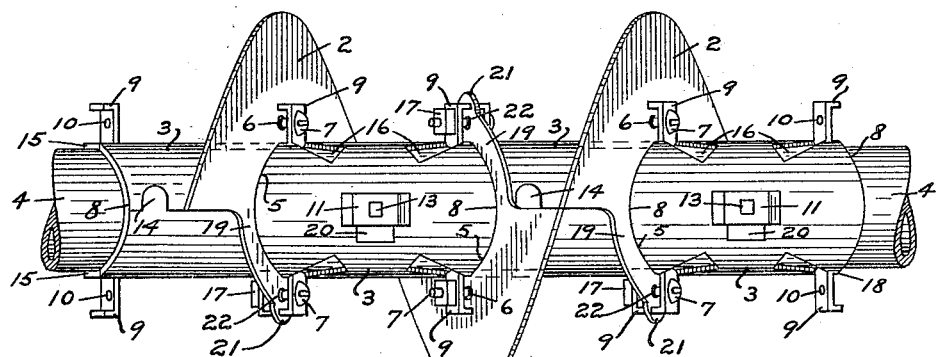
Fig. 2 is a bottom view of several successive sections of a screw conveyer having the successive flights reversibly associated with the central driving element of the conveyer.

The type of screw conveyer to which the present invention is especially applicable, comprises in general a central rod-like driving member ordinarily formed of a piece of standard pipe 4, a series of relatively short tubular members 3 embracing and secured to the pipe 4, and a series of reversible flight sections or blades 2 located between the ends of the successive tubular members 3 and arranged to form a substantially continuous helical vane extending longitudinally of the pipe 4. The conveyer element thus produced is ordinarily located within a stationary conduit or trough the walls of which are located directly adjacent to the periphery of the helical flight formed by the blades 2. The conveyer element is rotatable within the conducting conduit in order to urge material which is deposited in the path of the blades 2, along this conduit. The direction of transportation of the material is dependent upon the angular setting of the blades 2 and also upon the direction of rotation of the conveyer rotor.

The tubular members 3 have their ends disposed at a non-perpendicular angle relatively to the axis of the pipe 4, the adjacent ends of the members 3 being provided with diametrically opposite end projections 15 which are adapted to enter similarily formed recesses 18 in the ends of the adjacent members 3, in order to lock the successive sections to each other and to space them endwise from each other. Each of the tubular members 3 is formed by shearing a metal blank to the proper shape from a piece of sheet material, this blank after being properly formed and distorted to form various projections thereon, being rolled into tubular form and having its opposite ends connected by means of over-lapping projections 14 which are spot welded or otherwise secured to the underlying blank end. Each of the tubular members 3 is provided with a distorted portion forming a hollow boss 11, the metal of the member 3 laterally adjacent to this boss being cut away to form a recess 20. A nut 12 may be inserted within the space beneath each boss 11 after the member 3 has been slipped upon the pipe, through the cut away portion or recess 20. The members 3 after being properly positioned upon the pipe 4, are securely locked to the pipe by means of set screws 13 coacting with the nuts 12 in the bosses 11 and with the adjacent portions of the pipe 4. The set screws 13 preferably have screw threads the pitch of which differs from that of the nuts 12. This difference in pitch is not, however, sufficient to prevent the set screws 13 from passing through the nuts 12 and engaging the pipe 4, but it is sufficient to produce a locking action between the set screws 13 and the nuts 12 when these elements are in clamping position. The successive tubular members are of identical structure being made with a common die, thereby making them interchangeable.

Each of the tubular members 3 is provided with diametrically opposite sets of ears 9 having laterally bent outer extremities directed towards the ends 8 of the members 3. The ears 9 are formed by punching and distorting metal from the blanks from which the tubular members 3 are constructed, at the openings 16. The projections 15 at the ends 8 of the successive tubular members 3 serve to space the members 3 and the bent portions of the adjacent ears 9, apart a definite distance to form substantially annular grooves between the adjacent members 3. These grooves lie in planes which are non-perpendicular relatively to the axis of the pipe 4.

Figure 3:
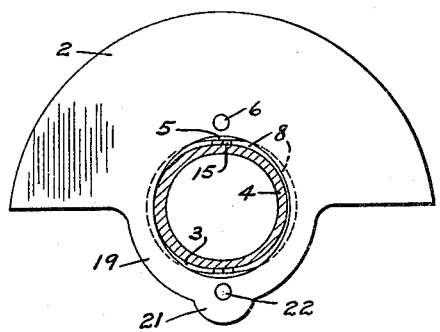
Fig. 3 is a transverse section through a screw conveyer of the type disclosed in Figs. 1 and 2, the section being taken in the plane of one of the conveyer blades.

The blades 2 are likewise formed with the aid of a die being of identical construction and therefore interchangeable. Each of the blades 2, as shown in Fig. 3, comprises a substantially semi-circular vane portion and a substantially semi-circular retaining portion 19 formed integral with the vane portion. The blades 2 are each provided with a substantially circular central opening 5 the diameter of which is substantially equal to the diameter of the elliptical cross-section of the pipe 4 in the plane of the blade when finally attached to the shaft. With the structure assembled, the portion of each blade directly adjacent to the circular opening 5 therein, is located in the recess provided by the pair of adjacent tubular members 3, the portion 19 of the blade forming the strap which completely encircles the supporting pipe 4. Each of the blades 2 is further provided with diametrically opposite openings 6, 22 which with the blade properly positioned upon the pipe 4, may be brought into alinement with openings 10 formed in the adjacent sets of ears 9. Each blade 2 may be rigidly secured to the tubular members 3 and the ears 9 thereof, by means of bolts 7 and nuts 17 passed through the alined openings in the ears 9 and the adjacent blade portions. By providing means for securing the blades 2 at diametrically opposite portions, the blade will be firmly held in position even if one of the clamping bolts 7 becomes dislodged.

With the successive blades 2 positioned as shown in the drawing, rotation of the supporting pipe 4 in a given direction will advance material deposited in the path of the blades 2 in a definite direction longitudinally of the conveyer conduit or trough. The direction of transportation of the material may be reversed either by reversing the direction of rotation of the pipe 4, or by advancing the blades 180° about the longitudinal axis of the pipe 4. Such adjustment of the blades 2 in order to effect reversal of the direction of transportation of the material without reversing the direction of rotation of the pipe 4, may be effected by removing the locking bolts 7 and swinging each of the successive blades 2 through an angle of 180°. The blades 2 may then be relocked to the pipe 4 by application of the bolts 7 to the then alined openings in the ears 9 and the adjacent blade portions. Such adjustment of the blades about the pipe 4 without disturbing the position of the tubular members 3, is permitted by the provision of the circular opening 5 with a diameter substantially equal to the major diameter of the adjacent elliptical cross-section of the pipe 4.

An objection to the prior screw conveyers of this general type has been the inability to prevent elements of the conveyer from dropping away from the supporting pipe 4. With the present construction the blades 2 are positively prevented from dropping away from the pipe 4 by the strap portions 19. The bolts 7 are locked in place by the resiliency of the ears 9 which are slightly distorted when the nuts 17 are screwed firmly in place. The set screws 13 and the nuts 12 coacting therewith are firmly locked in place by the provision of screw threads of different pitch. The tubular members 3 cannot become disassociated with the shaft 4 as they firmly embrace the shaft. It will thus be noted that provision has been made for positively preventing any of the elements of the conveyer rotor from falling into the trough through which the material is transported.

It will also be noted that the tubular members 3 and the blades 4 may be readily formed of sheet metal with the aid of dies, and that due to the relatively small amount of stock necessary to form the blanks for these elements, the cost of construction may be reduced to a minimum by utilizing sheet material which is ordinarily wasted.

It should be understood that it is not desired to limit the invention to the exact details of construction and of operation herein shown and described, for various modifications within the scope of the appended claims may occur to persons skilled in the art.

It is claimed and desired to secure by Letters Patent:

1. In combination, a shaft having an axis, a conveyer blade, and means for securing said blade to said shaft at a plurality of places and in a plane non-perpendicular to said axis, said blade being formed to permit adjustment about said shaft by shifting said blade in said plane.

2. In combination, a shaft having an axis, a conveyer blade, and means for securing said blade to said shaft on opposite sides of and in a plane non-perpendicular to said axis, said blade being formed to permit adjustment about said shaft by shifting said blade in said plane.

3. In combination, a shaft having an elliptical cross-section lying in a plane which is oblique relative to the shaft axis, a one-piece conveyer blade having a circular hole penetrated by said shaft, said hole having a diameter substantially equal to the major diameter of said cross-section, and means for securing said blade to said shaft on opposite sides of said axis while said blade is disposed in the plane of said cross-section.

4. In combination, a pair of coaxial tubular members having a recess between them lying in a plane which is inclined relatively to the axis of said members, a blade having a portion surrounding said axis and extending into said recess, said blade being formed to permit adjustment about said axis while retaining said portion within said recess and without increasing the width of said recess, and means on opposite sides of said axis for securing said blade to said members while said blade portion is disposed within said recess.

5. In combination, a pair of coaxial tubular members having plane adjacent end surfaces forming a recess lying in a plane which is inclined relatively to the axis of said members, a blade having a portion completely surrounding said axis and extending into said recess, said blade being formed to permit adjustment about said axis while retaining said members in fixed position relatively to each other, and means on opposite sides of said axis for securing said blade to both of said members.

6. In combination, a shaft, a sleeve surrounding said shaft, said sleeve having a boss formed to permit insertion of a nut within said boss while said sleeve is upon said shaft, means cooperating with said boss to lock said sleeve to said shaft, and a conveyer blade secured to said sleeve.

7. In combination, a shaft, a sheet metal tubular member engaging said shaft and having a portion thereof distorted to form a boss, means for permitting insertion of a nut within said boss while said member is in engagement with said shaft, and a conveyer blade secured to said tubular member.

In testimony whereof, the signature of the inventor is affixed hereto.

WALTER GEIST.